United States Patent
Johnson et al.

(10) Patent No.: US 7,465,510 B1
(45) Date of Patent: Dec. 16, 2008

(54) TURBOCOMPRESSOR IMPELLING FUEL RECYCLE IN FUEL CELL POWER PLANT

(75) Inventors: Henry G. Johnson, Cobalt, CT (US); Michael L. Perry, S. Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 606 days.

(21) Appl. No.: 10/804,342

(22) Filed: Mar. 19, 2004

(51) Int. Cl.
*H01M 8/04* (2006.01)
*H01M 8/18* (2006.01)

(52) U.S. Cl. .......................... 429/25; 429/19
(58) Field of Classification Search .................. 429/19, 429/25
See application file for complete search history.

(56) References Cited

U.S. PATENT DOCUMENTS

| | | | |
|---|---|---|---|
| 6,607,854 B1* | 8/2003 | Rehg et al. | 429/13 |
| 2003/0143448 A1* | 7/2003 | Keefer | 429/26 |
| 2005/0164069 A1* | 7/2005 | Margiott et al. | 429/38 |

* cited by examiner

*Primary Examiner*—Tracy Dove
(74) *Attorney, Agent, or Firm*—M. P. Williams

(57) ABSTRACT

A fuel cell power plant (7, 7a) has a stack (8) fed hydrogen-rich fuel gas from a source (14, 14a) with fuel recycle (30, 34) through a compressor (20) of a turbocompressor (19) having a turbine (17, 17a) driven either by high pressure hydrogen (14) or air exhaust (41).

7 Claims, 1 Drawing Sheet

TURBOCOMPRESSOR IMPELLING FUEL RECYCLE IN FUEL CELL POWER PLANT

TECHNICAL FIELD

This invention relates to the use of turbocompressors to impel fuel recycle gas from fuel flow exits to fuel flow inlets, the turbine being propelled either by (a) high pressure hydrogen fuel or (b) oxidant flow field exhaust.

BACKGROUND ART

In order to achieve very high fuel utilization (such as around 99%) in a fuel cell power plant, it is necessary to reduce the amount of hydrogen exiting the fuel cell. However, attempts to reach perfect utilization result in fuel starvation, typically in a spotty fashion, at various locations within individual cells, and in various cells. Recycling fuel, from the fuel flow field exits back to the fuel flow field inlets, allows the overall fuel cell stack utilization to be greater than the utilization in the fuel cells. Recycling also tends to cause a more even distribution of the fuel, and mitigates the effects of inert gases, such as nitrogen which migrates from the anode through the porous membrane.

Recycling the fuel requires a recycle blower or compressor which must be powered by electricity generated by the fuel cell, which is referred to as parasitic power. Further, pure hydrogen is difficult to pump due to its low density, and the pump motor must be appropriately rated to be non-sparking for safety.

DISCLOSURE OF INVENTION

Objects of the invention include: elimination of safety concerns attendant traditional fuel recycle blowers; reducing or eliminating parasitic power requirements for impelling fuel recycle gas; a simpler, more reliable fuel recycle impeller; omitting a powered motor in a recycle impeller; and improved implementation of fuel cell stack fuel recycle.

According to the present invention, recycle fuel in a fuel cell power plant is impelled by a compressor portion of a turbocompressor, the turbine of which is driven either by (a) high pressure hydrogen fuel or (b) exhaust from the oxidant flow field exit.

In one embodiment, high pressure hydrogen from a tank system drives the turbine, thereby totally eliminating any parasitic load on the fuel cell power plant. In other embodiments, air exhaust is used to operate a fuel recycle turbocompressor. Fuel cell stacks employing water transport plates operating near atmospheric pressure have a sufficiently low pressure drop across the oxidant gas flow fields that the air exhaust has sufficient pressure to operate the fuel recycle turbocompressor. The invention, however, may be used in fuel cell stacks which employ pressurized oxidant gas and having an air exhaust that is higher than ambient pressure. Not only is this advantageous for driving a recycle turbocompressor, but it is also advantageous from a water-balance perspective since pressurized air at any given temperature, carries less water vapor than ambient air; therefore, less water is lost from the fuel cell stacks when pressurized air is used. The invention can also be used with fuel cells operated at higher temperature. The invention is particularly well suited for use where oxidant gas stochiometry is well in excess of 100%. Thus, even if use of the oxidant gas exhaust to drive the bypass fuel impeller increases air blower parasitic power, it will only increase very slightly.

Use of the invention may completely eliminate the need for a conventional fuel recycle compressor with a drive motor, which is advantageous with respect to system simplicity and system safety.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
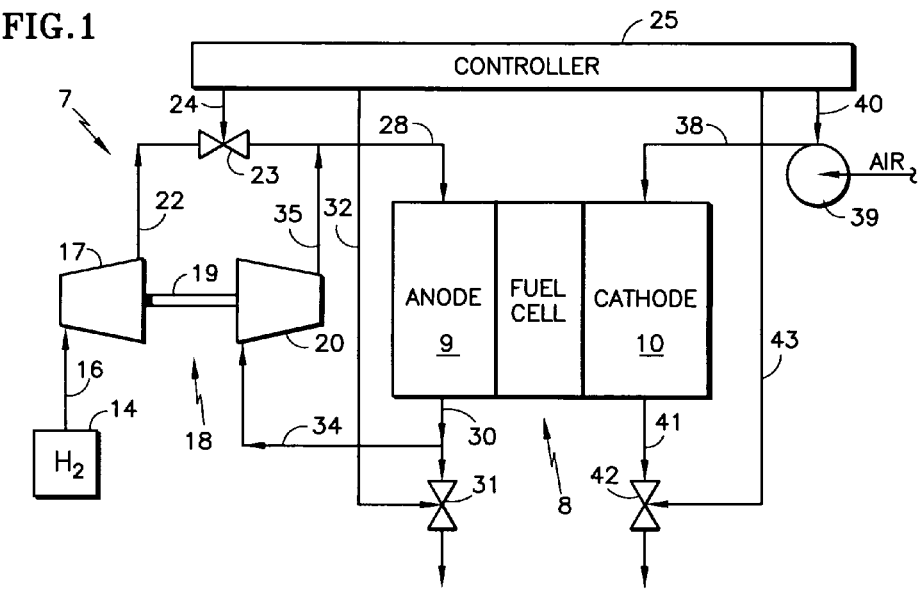
FIG. 1 is a simplified, stylized, schematic illustration of a fuel cell stack according to the invention having recycle fuel impelled by a turbocompressor which is driven by high pressure hydrogen from a tank system.

Referring to FIG. 1, a fuel cell power plant 7 according to the present invention includes a fuel cell stack 8 having a plurality of fuel cells, each with an anode 9 and a cathode 10. As is known, the anode is fed hydrogen-rich fuel, such as from a source of pressurized hydrogen 14.

According to the invention, the hydrogen 14 is provided by a conduit 16 to a turbine 17 of a turbocompressor 18, which drives a shaft 19 which in turn drives a compressor 20. The flow from the turbine 17 over a conduit 22 passes through a process-controlling valve 23 which is responsive to a signal on a line 24 from a controller 25. The correct amount of fuel is thus provided by the valve 23 over a conduit 28 to the fuel flow fields within the anode 9 of each cell. The partially spent fuel exiting from the anode flow fields into a conduit 30 may be expelled to ambient (or a burner, as is known) through a valve 31 in response to a signal on a line 32 from the controller 25, so as to purge the anode flow fields in a conventional way, when necessary. The partially depleted fuel in the conduit 30 is also provided by a conduit 34 to the inlet of the compressor 20, the outlet of which on a conduit 35 is connected to the inlet conduit 28, thus providing the fuel recycle function.

As is known, the cathode side of each fuel cell includes oxidant reactant gas flow fields which in this embodiment receive air over a conduit 38 from a pump 39 that is controlled by a signal 40 from the controller 25. The flow of air is also controlled by a pressure-creating restriction, which may be a valve 42 controlled by a signal on a line 43 from the controller 25, as is conventional.

The stochiometry of oxidant flow can be controlled by the valve 42 to suit the operational level (power output), which the controller 25 determines by adjusting the amount of inlet fuel through the valve 23. The embodiment of FIG. 1 operates passively in that the more inlet fuel there is, the more bypass fuel there will be, and the two are tied together by the turbocompressor 18.

Figure 2:
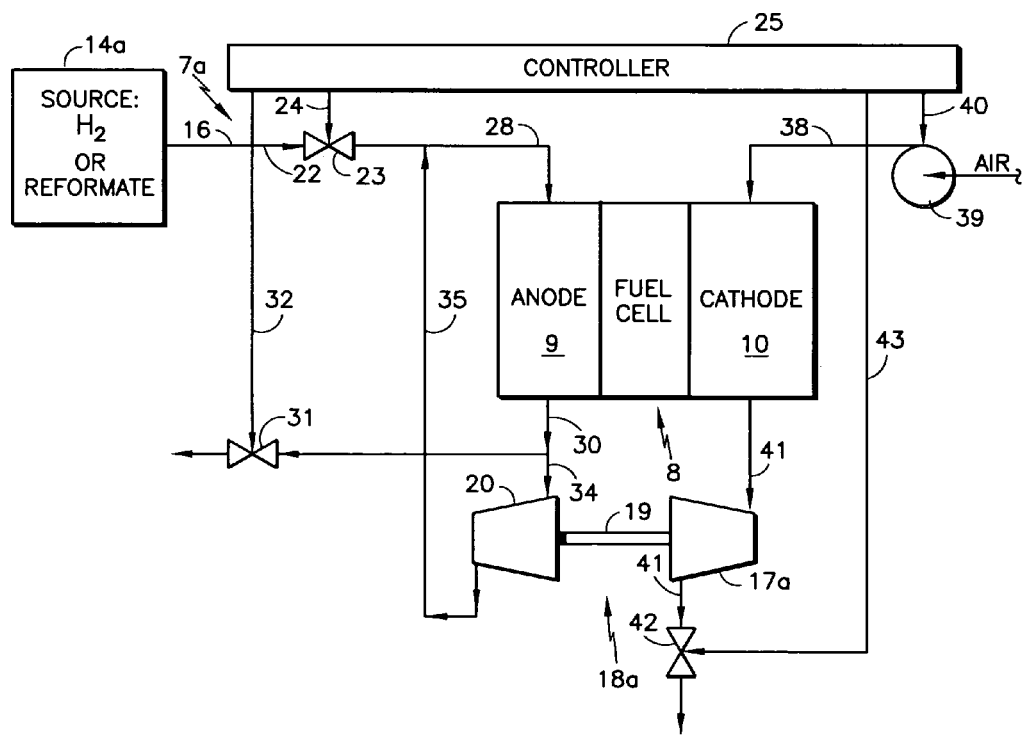
FIG. 2 is a simplified, stylized, schematic illustration of a fuel cell stack according to the invention having recycle fuel impelled by a turbocompressor which is driven by the oxidant exhaust of the fuel cell stack.

A second embodiment is a fuel cell power plant 7a of the invention illustrated in FIG. 2, fueled from a source 14a, may not only be used with a high pressure source of hydrogen, but it also may be used with hydrogen-rich reformate gas generated by a reformer, as is known. In the embodiment of FIG. 2, the turbine 17a of the turbocompressor 18a is driven by the exhaust in the conduit 41 from the cathode oxidant flow fields.

In this case, the recycle rate will be dependent upon the flow of air through the cathode sides of the cells. As the current density varies, the recycle rate, and therefore the recycle pressure will also vary. So long as the components are selected and balanced to provide for a minimally sufficient fuel recycle flow, the embodiment of FIG. 2 achieves the advantages of eliminating the electric motor without unduly affecting parasitic power, even if there is no high pressure hydrogen source.

The turbocompressors of the present invention may be utilized to impel recycle fuel to other than the first stage of fuel flow fields as is described in copending U.S. patent application Ser. No. 10/765,735 filed Jan. 27, 2004 and entitled "Fuel Cell System Having Inlet Fuel to More Than One and/or Recycle to Less Than All of the Fuel Fields".

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant, comprising:
   a plurality of fuel cells, each cell having an anode, a cathode and a proton exchange membrane disposed between the anode and the cathode;
   fuel reactant flow fields on an anode side of said membrane and oxidant reactant flow fields on a cathode side of said membrane, each of said flow fields having an inlet and an outlet;
   a source of hydrogen-rich fuel gas, said hydrogen-rich fuel gas being applied to said fuel reactant flow fields;
   a source providing oxidant reactant gas to said oxidant flow fields;
   an impeller connected to at least some of said fuel flow field outlets for pumping partially depleted fuel to at least some of said fuel flow field inlets;
   said impeller comprising a compressor of a turbocompressor, a turbine of which is driven by said hydrogen-rich fuel gas.

2. A fuel cell power plant according to claim 1, wherein:
   said impeller is connected between all of said fuel flow field outlets and all of said fuel flow field inlets.

3. A fuel cell power plant, comprising:
   a plurality of fuel cells, each cell having an anode, a cathode and a proton exchange membrane disposed between the anode and the cathode;
   fuel reactant flow fields on an anode side of said membrane and oxidant reactant flow fields on a cathode side of said membrane, each of said flow fields having an inlet and an outlet;
   a source of hydrogen-rich fuel gas, said hydrogen-rich fuel gas being applied to said fuel reactant flow fields;
   a source providing oxidant reactant gas to said oxidant flow fields;
   an impeller connected to at least some of said fuel flow field outlets for pumping partially depleted fuel to at least some of said fuel flow field inlets;
   said impeller comprising a compressor of a turbocompressor, a turbine of which is driven by oxidant reactant gas flowing from said oxidant flow field outlets.

4. A fuel cell power plant according to claim 3, wherein:
   said source providing oxidant reactant gas is an air pump.

5. A fuel cell power plant according to claim 3 wherein:
   said source providing oxidant reactant gas is an air blower.

6. A fuel cell power plant according to claim 3, wherein:
   said impeller is connected between all of said fuel flow field outlets and all of said fuel flow field inlets.

7. A fuel cell power plant, comprising:
   a plurality of fuel cells, each cell having an anode, a cathode and a proton exchange membrane disposed between the anode and the cathode;
   fuel reactant flow fields on an anode side of said membrane and oxidant reactant flow fields on a cathode side of said membrane, each of said flow fields having an inlet and an outlet;
   a source of hydrogen-rich fuel gas, said hydrogen-rich fuel gas being applied to said fuel reactant flow fields;
   a source providing oxidant reactant gas to said oxidant flow fields;
   an impeller connected to at least some of said fuel flow field outlets for pumping partially depleted fuel to at least some of said fuel flow field inlets;
   said impeller comprising a compressor of a turbocompressor, a turbine of which is driven directly by said hydrogen-rich fuel gas.

* * * * *